United States Patent Office.

MINNA WESSELHŒFT, OF BALTIMORE, MARYLAND.

Letters Patent No. 82,909, dated October 6, 1868.

IMPROVED EXTRACT OF BARLEY-MALT.

*The Schedule referred to in these Letters Patent and making part of the same.*

TO ALL WHOM IT MAY CONCERN:

Be it known that I, MINNA WESSELHŒFT, of the city and county of Baltimore, in the State of Maryland, have invented a new and improved Mode of Obtaining a Pure Extract of Barley-Malt, for curative and dietetic purposes; and I do hereby declare that the following is a full and exact description thereof.

The nature of my invention consists in treating malted barley by a certain process, so as to utilize nearly the entire bulk of the grain, deprive the extract of its fermentable qualities, and prepare therefrom a dietetic tonic for nutritive and remedial purposes.

To enable others skilled in the art to make and use my invention, I will proceed to describe the process of its preparation.

I mix two parts of barley-malt with three parts of water, previously heated to a temperature of 100° to 120° Fahrenheit, over a slow fire, gradually increasing the temperature to 160°. When this is reached, the thick, pulpy mass of hulls and starch is gradually dissolved to a clear, watery consistence, diastase, the nutritive principle, being developed.

This, acting upon the bulk of the starch for several hours, holds the same in solution, resolving it into a clear brown liquid. Constant stirring is necessary during this dissolving process. The hulls are then separated by filtration through cotton bags, and the liquid thus obtained is at once placed over a rapid fire and boiled for a time, until the albumen it contains coagulates, when it is also separated by filtration through felt or flannel.

The albumen, by being thus solidified and renewed, deprives the remaining liquid of its fermentable qualities to a great extent.

After removing the albumen, as stated, the rich, strong liquid obtained is ready to be concentrated, by evaporation, to a dense gelatinous mass, which, when cooled, is cut into strips and dried in the air, or by artificial heat, and will, when pulverized, yield a fine white powder. Otherwise, the liquid may be reduced to a semi-fluid state only, retaining its saccharine and glutinous properties, &c.

When intended for use in a semi-fluid state, in which way I usually prepare it as an article of manufacture, as a gentle tonic, for nutritive and curative purposes, I add caramel or burnt cane-sugar. This is prepared by constant stirring over a rapid fire, until the mass becomes almost black, and is nearly deprived of its sweetness, when a small quantity of water is added, and the boiling continued until the mass reaches the same degree of smoothness possessed by the malt sirup, to which it is added in the proportion of two parts of burnt sugar to seven parts of malt sirup, facilitating the concentration of the latter, and, besides, giving it consistence, flavor, and color, as also aiding in its preservation. I may add, if desired, a decoction of "gentian."

Having thus described my invention, what I claim as new, and desire to secure by Letters Patent of the United States, is—

A new article of manufacture for dietetic and remedial purposes, a concentrated extract of malt, prepared in the manner as described.

MINNA WESSELHŒFT.

Witnesses:
  ROBT. LAUTENBACH, M. D.
  ANTHONY BONN.